May 13, 1924.　　　M. M. HANSON　　　1,493,878
ANTISKID CHAIN
Filed April 18, 1922
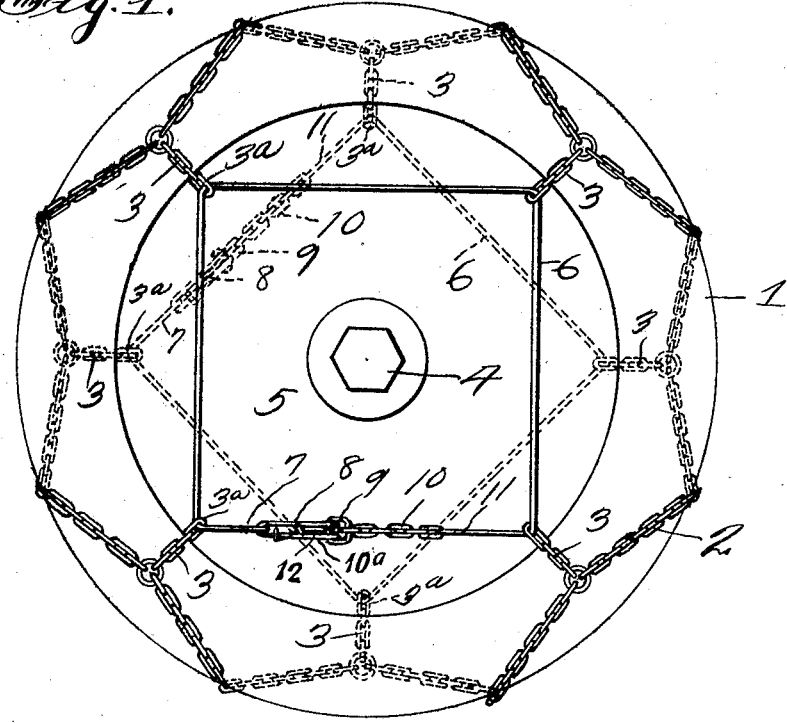
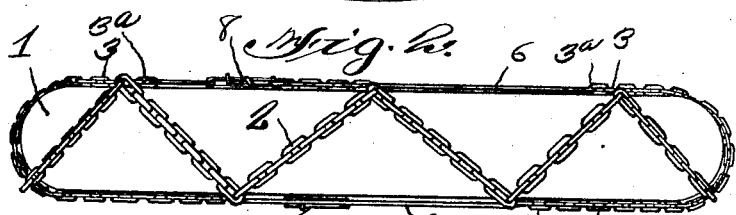
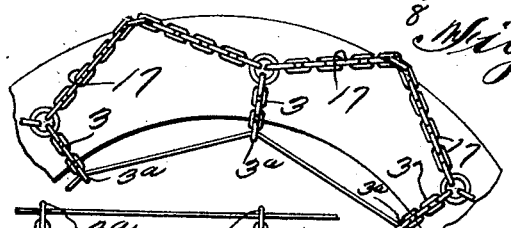
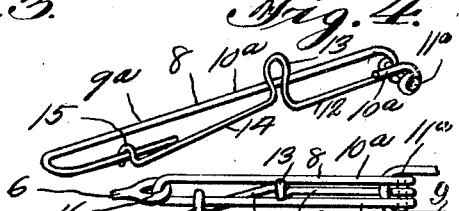
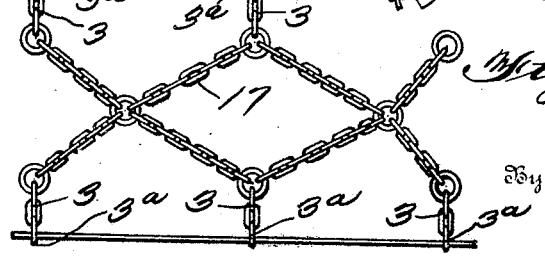
Inventor
M. M. Hanson
By D. Swift
Attorney Patented May 13, 1924.

1,493,878

UNITED STATES PATENT OFFICE.

MARTIN M. HANSON, OF CLEARWATER, NEBRASKA.

ANTISKID CHAIN.

Application filed April 18, 1922. Serial No. 555,175.

*To all whom it may concern:*

Be it known that I, MARTIN M. HANSON, a citizen of the United States, residing at Clearwater, in the county of Antelope, State of Nebraska, have invented a new and useful Antiskid Chain; and I do hereby declare the following to be a full, clear, and exact description of the invention, such as will enable others skilled in the art to which it appertains to make and use the same.

The invention relates to antiskid chains for automobile tires and has for its object to provide a device of this character wherein the links are so arranged, preferably in a zigzag arrangement whereby movement of the links as the tire moves over the ground is reduced to a minimum and consequently wear on the links where they join each other is reduced to a minimum.

A further object is to provide the antiskid chain with chain sections extending inwardly towards the center of the wheel through links of which sections a pliable wire may be passed and have its ends connected together by a fastener thereby securely holding the antiskid chain on the tire.

A further object is to provide a fastening device for tightening and holding the pliable device, said device comprising a U-shaped member having its ends connected together, a pivoted arm pivoted between the arms of the U-shaped member and provided with a loop adapted to spring between the arms of the U-shaped member, and also provided with a hook adapted to hook over one of the arms and on the outside thereof, thereby holding the device in closed position.

A further object is to provide an antiskid chain for a tire formed from a single length of chain having chain sections connected thereto at equally spaced points, alternate chain sections being disposed on opposite sides of the tire and fastening means for connecting said alternate chain sections in such a manner that a zigzag arrangement of the single chain on the tire is formed and held.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of a conventional form of tire, showing the tire chain and the tire chain tightener applied thereto.

Figure 2 is a plan view of a tire, showing the antiskid chain applied thereto.

Figure 3 is a side elevation of a portion of a tire, showing a portion of the diamond shaped arranged anti-skid chain.

Figure 4 is a perspective view of the chain fastening device.

Figure 5 is a plan view of a portion of the antiskid chain showing the diamond shaped arrangement.

Figure 6 is a top plan view of the fastening device.

Referring to the drawings, the numeral 1 designates a conventional form of automobile tire and 2 an antiskid chain carried thereby. The antiskid chain 2 is preferably formed from a single length of chain having its ends joined together and at spaced points is provided with chain sections 3, which sections are adapted to extend inwardly in direction of the hub 4 of the wheel 5 with alternate chain sections 3 on opposite sides of the tire 1, the chain being provided with sufficient slack whereby a zigzag arrangement of the chain is accomplished. Extending through the end links $3^a$ of the chain sections 3 on each side of the wheel are pliable securing wires 6. One end 7 of each of said wires 6 is provided with a fastening and tightening device 8, and by means of which tightening device, which cooperates with the end link 9 of the chain section 10 carried by the end 11 of the pliable wires 6, the pliable wire may be tightened and shortened thereby holding the chain in zigzag position, or holding any other design of chain in position, such for instance as that shown in Figures 3 and 5. It will be seen that when the pliable wires 6 on both sides of the wheel are tightened that the chain will be positively held in zigzag arrangement and that the links of the chain are held in positions where a minimum amount of wear will take place incident to the links moving independently of each other.

The fastening device 8 comprises a U-shaped member $9^a$, the arms $10^a$ of which are connected together by means of the pin $11^a$. Pivotally mounted on the pin $11^a$ and disposed between the arms $10^a$ is an arm 12, which arm is adapted to be passed through the link 9 of the chain section 10 and then forced upwardly until its loop 13 springs between the spaced arms 10ª thereby holding the arm 12 against displacement. The free end 14 of the arm 12 extends under one of the arms 10ª and is provided with an upwardly and downwardly extending hook 15, which hooks over one of the arms 10ª, there being sufficient spring in the spring wire from which the device is formed to allow the arm 12 to spring until the hook 15 is received by the arm 10ª. It will be seen that the fastener is positively locked and that the device may be quickly unfastened when desired. The end 7 of the pliable wire 6 is connected at 16 to the U-shaped member 9ª of the fastener, this connection may be of any suitable form.

Referring to Figures 3 and 5 wherein a diamond shaped arrangement 17 of the chain is provided, it will be seen that by so arranging the same a positive gripping of the ground is insured and that the movement of the links independently of each other is reduced to a minimum, thereby obviating wear on the links and at the same time securing maximum ground gripping.

In this form the chain is attached to the tire in the same manner as shown in Figure 1, by means of the pliable wires 6.

The invention having been set forth what is claimed as new and useful is:—

An antiskid tire chain formed from a single length of chain, chain sections carried by said single length of chain at spaced intervals, alternate chain sections being disposed on opposite sides of a tire, and tightening means for connecting the chain sections on each side of the tire together thereby holding the single length of chain on the tire in zigzag arrangement said tightening means comprising rectangularly arranged flexible members extending through the inner ends of the chain sections, said rectangularly arranged flexible members being out of registration with each other.

In testimony whereof I have signed my name to this specification in the presence of two subscribing witnesses.

MARTIN M. HANSON.

Witnesses:
DALE WYMAN,
J. C. ROGERS.